(12) United States Patent
Butt et al.

(10) Patent No.: US 7,946,151 B2
(45) Date of Patent: May 24, 2011

(54) PROTON EXCHANGE MEMBRANE FUEL CELL HUMIDITY SENSOR

(75) Inventors: Shazad Mahmood Butt, Troy, MI (US); William Samuel Schwartz, Pleasant Ridge, MI (US)

(73) Assignee: Ford Motor Company, Dearborn, MI (US)

( * ) Notice: Subject to any disclaimer, the term of this patent is extended or adjusted under 35 U.S.C. 154(b) by 399 days.

(21) Appl. No.: 12/101,354

(22) Filed: Apr. 11, 2008

(65) Prior Publication Data

US 2009/0255323 A1 Oct. 15, 2009

(51) Int. Cl.
*G01N 19/00* (2006.01)
(52) U.S. Cl. ..................................... 73/29.02
(58) Field of Classification Search ............... 73/29.02
See application file for complete search history.

(56) References Cited

U.S. PATENT DOCUMENTS

| | | | |
|---|---|---|---|
| 3,811,951 A | 5/1974 | Stedman | |
| 3,933,043 A | 1/1976 | Shuler | |
| 4,131,011 A * | 12/1978 | Ling | 73/29.01 |
| 4,343,177 A | 8/1982 | Carlon et al. | |
| 5,190,726 A | 3/1993 | Shinoki et al. | |
| 5,377,528 A | 1/1995 | Dauvergne | |
| 6,706,430 B2 | 3/2004 | Wheat et al. | |
| 6,821,660 B2 | 11/2004 | Andrews et al. | |
| 7,231,815 B2 * | 6/2007 | Kanare | 73/73 |
| 2003/0064271 A1 | 4/2003 | Stenersen | |
| 2003/0115943 A1 | 6/2003 | Ueno et al. | |
| 2003/0189416 A1 | 10/2003 | Scholta et al. | |
| 2004/0185315 A1 | 9/2004 | Enjoji et al. | |
| 2005/0053815 A1 | 3/2005 | Yang et al. | |
| 2005/0247107 A1 | 11/2005 | Speldrich et al. | |
| 2006/0201247 A1 | 9/2006 | Speldrich et al. | |
| 2006/0225488 A1 | 10/2006 | Speldrich | |
| 2006/0237551 A1 | 10/2006 | Engler et al. | |
| 2007/0186619 A1 | 8/2007 | Butt et al. | |

FOREIGN PATENT DOCUMENTS

EP 0075425 A1 3/1983

OTHER PUBLICATIONS

Annotated front page of United States Patent 4,131,011, originally published on Dec. 26, 1978.*

* cited by examiner

*Primary Examiner* — Hezron Williams
*Assistant Examiner* — Tamiko D Bellamy
(74) *Attorney, Agent, or Firm* — Damian Porcari; Brooks Kushman P.C.

(57) ABSTRACT

A humidity sensing device for determining the amount of humidity in at least one primary fluid stream that is passed to a fuel cell stack is provided. The sensing device includes an outer housing and an inner housing. The outer housing is positioned within at least one conduit such that the outer housing and the conduit coact with each other to generate at least one secondary fluid stream from the primary fluid stream. The inner housing is positioned within the outer housing such that the inner housing is configured to receive the secondary fluid stream and to measure an amount of water present in the secondary fluid stream to determine the amount of humidity in the primary fluid stream.

19 Claims, 3 Drawing Sheets

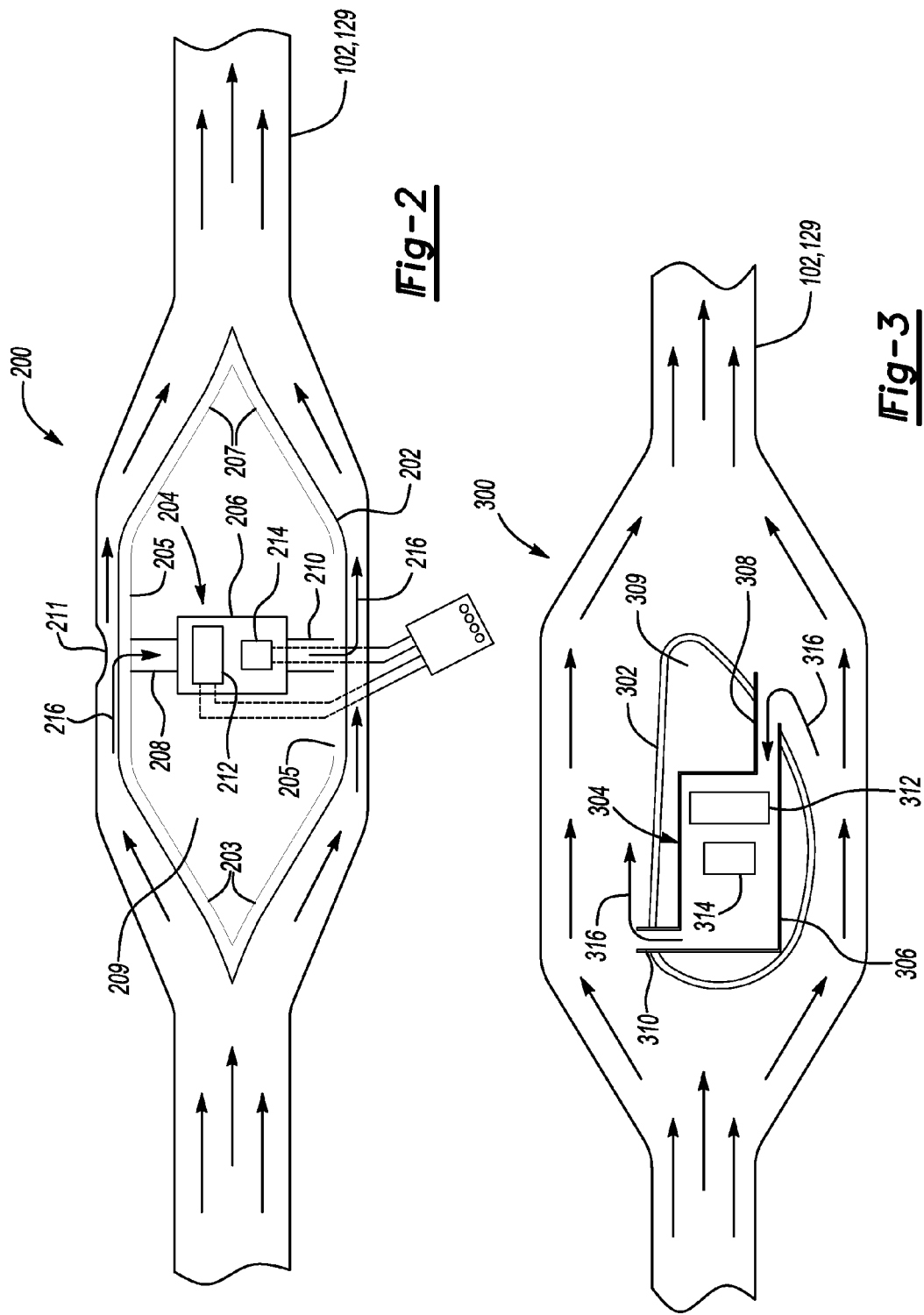

PROTON EXCHANGE MEMBRANE FUEL CELL HUMIDITY SENSOR

BACKGROUND

1. Technical Field

The embodiments described herein generally relate to a sensing device for measuring humidity.

2. Background Art

It is generally known that a fuel cell stack provides electrical power in response to electrochemically converting hydrogen and oxygen into water. It is also known that the membranes within the fuel cell stack are kept moist to facilitate performance and to prevent damage. Conventional systems deliver water in the air and hydrogen streams to ensure that such membranes are kept moist. While it may be beneficial to ensure that membranes are kept moist, too much water (particularly in the liquid phase) in the air and hydrogen streams may lead to inefficient operation of the fuel cells in the stack.

In some fuel cell based electrical vehicles, a humidity sensor may be used to detect the amount of water in the air and hydrogen streams. The humidity sensors may be used to provide feedback to a water control mechanism for controlling the amount of water that is inserted into the air and hydrogen streams.

Accordingly, it would be desirable to provide a robust system and method for measuring the amount of water in the air and hydrogen streams prior to the delivery of such streams to the fuel cell stack.

SUMMARY

In at least one embodiment, a humidity sensing device for determining an amount of humidity in at least one primary fluid stream that is passed to a fuel cell stack is provided. The sensing device includes an outer housing and an inner housing. The outer housing is positioned within at least one conduit such that the outer housing and the conduit coact with each other to generate at least one secondary fluid stream from the primary fluid stream. The inner housing is positioned within the outer housing and configured to receive the secondary fluid stream and to measure an amount of water present in the secondary fluid stream to determine the amount of humidity in the primary fluid stream.

BRIEF DESCRIPTION OF THE DRAWINGS

FIG. 2 depicts a humidity sensing device in accordance to one embodiment of the present invention;

FIG. 3 depicts a humidity sensing device in accordance to another embodiment of the present invention.

DETAILED DESCRIPTION OF THE PREFERRED EMBODIMENT(S)

Figure 1:
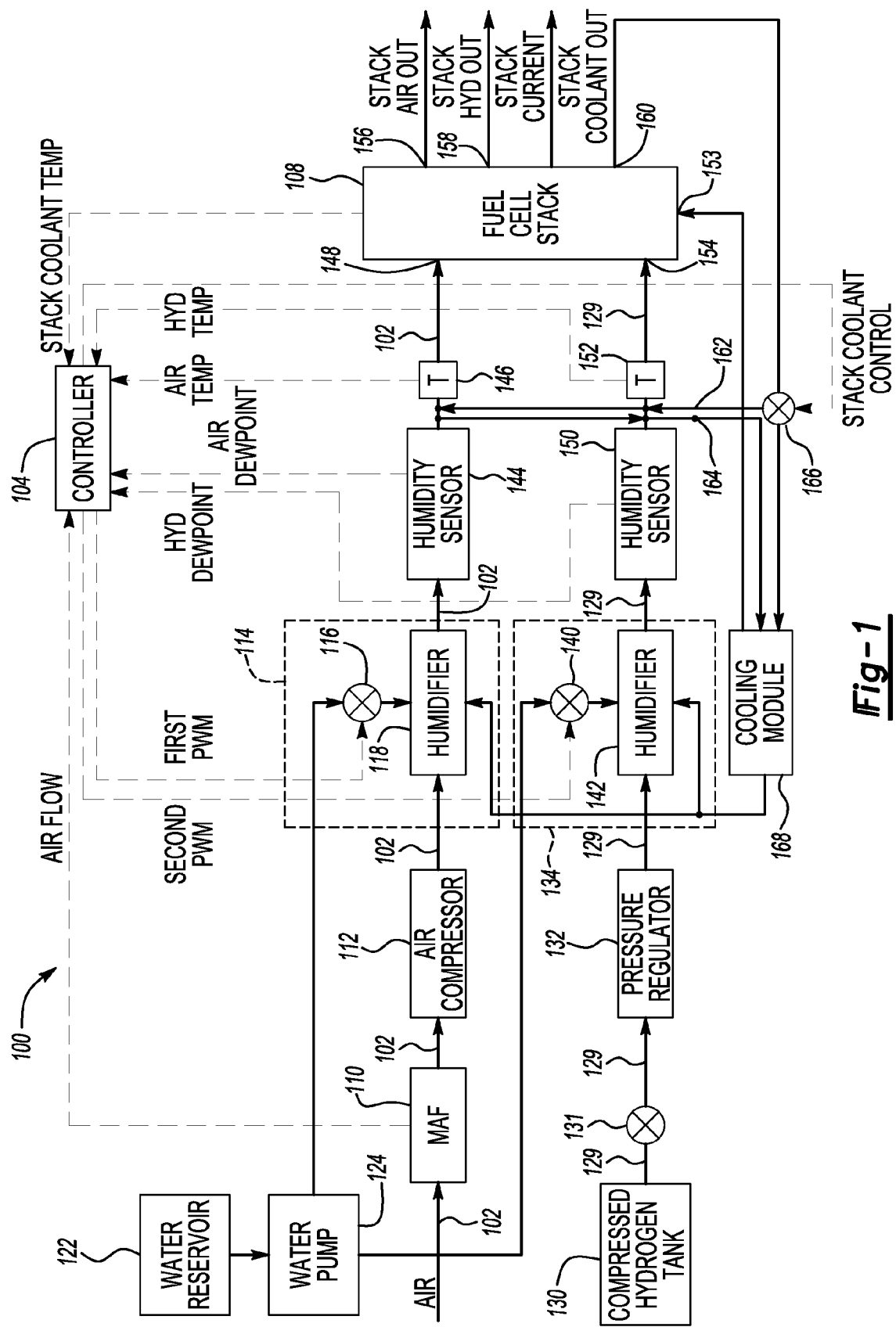
FIG. 1 depicts a fuel cell stack system in accordance to one embodiment of the present invention.

FIG. 1 illustrates an exemplary fuel cell system 100 in accordance to one embodiment of the present invention. The system 100 may be implemented in an electric vehicle or hybrid vehicle or any such vehicle which uses voltage to drive a motor. The system 100 generally comprises a controller 104 and a fuel cell stack 108.

A first fluid stream (or cathode stream) which comprises air is fed to the fuel cell stack 108 via an air conduit 102. A mass airflow sensor 110 is adapted to receive the air stream. The air passing through the mass airflow sensor 110 may be dry air, or it may have a high water content. The mass airflow sensor 110 measures the amount and density of air in the fluid stream. An air compressor 112 is fluidly coupled to the mass airflow sensor 110 via the air conduit 102. The air compressor 112 pressurizes the air stream.

A first humidifier arrangement 114 is configured to add water in the air stream. The first humidifier arrangement 114 includes a water injector 116 and a humidifier 118. In one example, the first humidifier arrangement 114 may be implemented as a gas-to-gas humidifier. The particular type of humidifier arrangement used may be varied to meet the desired criteria of a particular implementation. The controller 104 may control the water injector 116 with a first pulse width modulated (PWM) signal. The water injector 116 may be implemented as a solenoid or other valve and control the amount of water that is being added to humidifier 118 in response to the first PWM signal.

In one example not shown, the water injector valve 116 may be positioned between the mass airflow sensor 110 and the air compressor 112. In such an example, the water injector valve 116 may inject water directly into the compressor 112 and the humidifier 118 may be eliminated from the system 100.

A water pump 124 is coupled to the water injector 116. The water reservoir 122 provides water to the water injector 116 via the water pump 124. In one example, the fuel cell stack 108 may provide a water supply to the water reservoir 122. For example, the fuel cell stack 108 may generate water in response to combining chemicals from the air and hydrogen streams and provide such water to the water reservoir 122.

A tank (or supply) 130 of compressed hydrogen generally provides a second fluid stream (or anode stream). The second fluid stream comprises compressed hydrogen that can be used by the fuel cell stack 108. The hydrogen stream is fed to the fuel cell stack 108 via a hydrogen conduit 129. While compressed hydrogen may be used in the system 100, any hydrogen fuel source may be implemented in the system 100. For example, liquid hydrogen, hydrogen stored in various chemicals such as sodium borohydride or alanates, or hydrogen stored in metal hydrides may be used instead of compressed gas. A tank valve 131 is fluidly coupled to the hydrogen tank 130 via the hydrogen conduit 129. The tank valve 131 controls the flow of hydrogen entering into the system 100. A pressure regulator 132 is coupled to the tank valve 131 via the hydrogen conduit 129. A pressure regulator 132 regulates the flow of the hydrogen. The hydrogen passing through the pressure regulator 132 may be dry hydrogen, or it may have a high water content. A second humidifier arrangement 134 is configured to add water into the hydrogen stream.

The second humidifier arrangement 134 includes a water injector 140 and a humidifier 142. In one example, the second humidifier arrangement 134 may be implemented as a gas-to-gas humidifier. The particular type of humidifier arrangement used may be varied to meet the desired criteria of a particular implementation. The controller 104 may control the water injector 140 with a second PWM signal. The water injector 140 may be implemented as a solenoid or other valve and control the amount of water that is being added to humidifier 142 in response to the second PWM signal. The humidifier 142 introduces water into the hydrogen stream in response to the amount of water received by the water injector 140. The water pump 124 is coupled to the water injector 140. The water reservoir 122 provides water to the water injector 140 via the water pump 124.

A first humidity sensor 144 is fluidly coupled to the humidifier 118 via the air conduit 102. The first humidity sensor 144 is configured to measure the dew point in the air stream and to transmit data to the controller 104. In one example, the first humidity sensor 144 may be implemented as a capacitive complementary metal oxide semiconductor (CMOS) sensing element. The dew point is generally a function of relative humidity and temperature. The first humidity sensor 144 may be adapted to measure any number of characteristics related to determining the amount of water in the air. A temperature sensor 146 may be fluidly coupled to the first humidity sensor 144 via the air conduit 102. The temperature sensor 146 measures the temperature of the air stream and transmits data to the controller 104. A first inlet 148 of the fuel cell stack 108 is coupled to the temperature sensor 146 via the air conduit 102. The first inlet 148 is configured to receive the humidified air.

A second humidity sensor 150 is fluidly coupled to the humidifier 142 via the hydrogen conduit 129. The second humidity sensor 150 is configured to measure the dew point in the hydrogen stream and to transmit data to the controller 104. The second humidity sensor 150 may be implemented as a CMOS sensing element. The second humidity sensor 150 may be adapted to measure any number of characteristics related to the amount of water in the hydrogen stream. A temperature sensor 152 may be fluidly coupled to the second humidity sensor 150. The temperature sensor 152 measures the temperature of the hydrogen. A second inlet 154 of the fuel cell stack 108 is coupled to the temperature sensor 152 via the hydrogen conduit 129. The second inlet 154 receives the humidified hydrogen stream.

The fuel cell stack 108 generates power to drive a motor. In general, the fuel cell stack 108 electrochemically converts oxygen from the air stream and hydrogen from the hydrogen stream to produce electricity and water. Membranes (not shown) facilitate the process of electrochemically converting oxygen and hydrogen to produce electricity and water. The fuel cell stack 108 generates current in response to converting oxygen and hydrogen into water. Such current may drive an electric motor (not shown) coupled to the fuel cell stack 108. The fuel cell stack 108 may provide information related to the current to the controller 104 via a current sensor (not shown). The fuel cell stack 108 comprises first, second and third outlets 156, 158 and 160. The first outlet 156 presents product water and air generated from the fuel cell stack 108. The second outlet 158 presents hydrogen from the fuel cell stack 108. The third outlet 160 presents coolant in the form of de-ionized (DI) water ethylene glycol or other suitable coolant from the fuel cell stack 108 which has been used to remove heat from the fuel cell stack 108 which was generated as a result of combining hydrogen with oxygen (e.g., from the air stream). A cooling module 168 is coupled to the third outlet 160. The cooling module 168 is adapted to present coolant to the humidifiers 118 and 142. An inlet 153 of the fuel cell stack 108 is adapted to receive the coolant from the cooling module 168.

In operation, the system 100 is adapted to ensure that proper levels of humidity in the air and hydrogen streams are delivered to the inlets 148, 154 for ensuring the proper operation of the membranes in the fuel cells in the fuel cell stack 108. The first humidity sensor 144 is adapted to measure the amount of water in the air stream and to transmit data to the controller 104 thereby establishing a closed loop system with the controller 104 for controlling the amount of water that is added to the air stream. The controller 104 controls the humidifier arrangement 114 to deliver water to the air stream such that the air stream reaches a predetermined humidity level.

The second humidity sensor 150 is adapted to measure the amount of water in the hydrogen stream and transmit data to the controller 104 to establish a closed loop system with the controller 104 for controlling the amount of water that is added to the hydrogen stream. The controller 104 controls the humidifier arrangement 134 to deliver water to the hydrogen stream so that the hydrogen stream reaches a predetermined humidity level. The predetermined humidity levels for the air and/or hydrogen streams may be established as disclosed in copending U.S. application Ser. No. 11/764,249 filed on Jun. 18, 2007, entitled "Fuel Cell Humidity Control System and Method" which is incorporated in its entirety by reference.

In general, the operation performed by the first and second humidity sensors 144, 150 may provide a useful mechanism for measuring the amount of water in the air and hydrogen streams. Such measurements may allow the controller 104 to control the first and second humidifier arrangements 114 and 134 accordingly and to add the proper amount of water for ensuring the air and hydrogen stream reaches their respective predetermined humidity levels prior to delivery to the fuel cell stack 108.

FIG. 2 depicts a humidity sensing device 200 in accordance to one embodiment of the present invention. The humidity sensing device 200 may be positioned within each of the air and hydrogen conduits 102, 129 and operate in a manner similar to the operation of the sensors 144, 150 of the system 100. The conduits 102, 129 enclose the air and hydrogen streams for delivery to the fuel cell stack 108. The conduits 102, 129 may be constructed out of stainless steel and/or aluminum or any suitable material. The humidity sensing device 200 may be generally centered when positioned within each conduit 102, 129. The humidity sensing device 200 includes an outer housing 202 and an inner housing 204. The outer housing 202 and the inner housing 204 may each be constructed from stainless steel, aluminum or other suitable material. The outer housing 202 as depicted in FIG. 2 may be shaped in the form of a human eye. The shape of the outer housing 202 may be a wing, airfoil, circle, wedge, or other suitable shape. The particular shape of the outer housing 202 may vary based on the desired criteria of a particular implementation. The outer housing 202 includes a pair of contacting walls 203, a pair of side walls 205 and a pair of downstream walls 207. The walls 203, 205, 207 define a cavity 209 which surrounds a substantial amount of the inner housing 204.

The inner housing 204 includes a central housing 206, a housing inlet 208 and a housing outlet 210. The inlet 208 and the outlet 210 each include openings (not shown) to allow portions of the air or hydrogen streams to pass through and from the central housing 206. The conduits 102, 129 include a protrusion 211 positioned on a wall of the conduit spaced opposite to the side wall 205. As shown, the outer housing 202 is generally shaped in a symmetric pattern. The protrusion 211 causes an asymmetrical flow field (e.g., of the air or hydrogen stream) around the outer housing 202. The asymmetrical flow field around the outer housing 202 creates a velocity distribution of the air or hydrogen flow field around the outer housing 202. The velocity distribution causes a higher velocity of the flow field at a region proximate to the protrusion 211 and the housing outlet 210 with respect to the velocity of the flow field at a region proximate to the housing inlet 208. A lower pressure of the flow is exhibited at the outlet 210 due to the high velocity of the flow field at the outlet 210.

A higher pressure of the flow is exhibited at the inlet 208 than that of the pressure of the flow at the outlet 210, thereby creating a pressure differential across the outer housing 202 (e.g., pressure differential across top and bottom of outer housing 202). The pressure differential drives a secondary fluid stream 216 into the housing inlet 208.

In general, the particular shape of the protrusion on the conduit wall, or the symmetrical shape of the outer housing is not to be construed as the only manner in which the secondary fluid stream is created and passed through the inner housing. The embodiments of FIGS. 3-4 also depict that the walls of the conduits and/or the shape of the outer housing may take on any number of configurations or arrangements with respect to each other so long as the arrangement between the inner walls of conduit and the outer housing produces: (i) an asymmetric flow field which surrounds the outer housing, (ii) a velocity distribution of the hydrogen or air stream about the outer housing, and (iii) a pressure differential across the outer housing generated in response to velocity distribution. Such conditions may drive a secondary (e.g., air or hydrogen) fluid stream through the inner housing which allows the inner housing to measure the humidity in the secondary fluid stream.

The central housing 206 includes a heater 212 and humidity sensing elements 214. The heater 212 is adapted to heat the secondary fluid stream 216 flowing through the central housing 206 such that water (e.g., in vapor form) in the secondary fluid stream 216 does not condense on the internal surfaces of the central housing 206 or on the humidity sensing elements 214 positioned therein. The humidity sensing elements 214 are adapted to measure the dew point in the secondary fluid stream 216. Such a measurement is generally indicative of the amount of water that is in the air and hydrogen streams. Such information may be used by the controller 104 to determine the amount of water (e.g., the humidity) in the air and hydrogen streams and to control the first and second humidifier arrangements to achieve predetermined humidity levels.

The outer housing 202 protects the inner housing 204 so that the inner housing 204 may be positioned directly within the primary flow of the air and hydrogen streams. The outer housing 202 coupled with the placement of the inlet 208 and the outlet 210 prevents water droplets present in the primary flow (e.g., water in liquid form) from entering into the inner housing 204. The housing inlet 208 and the outlet 210 are generally positioned at an angle that is ninety degrees or greater with respect to the flow direction of the primary stream. For example, an input opening of the inlet 208 may be positioned in a direction generally facing toward fuel cell stack 108. Likewise, an output opening of the outlet 210 may be positioned in a direction generally facing toward the fuel cell stack 108. The walls 203, 205, and 207 (e.g., the outer housing 202) are adapted to protect the sensing elements 214 from exposure to a large amount of water that may be present in the primary fluid stream to prevent saturation and to reduce the likelihood for the sensing elements 214 to report inaccurate readings, particularly during cold start operations. Such a minimization of water entering into the inner housing 204 coupled with the heating action of the heater 212 to minimize or eliminate condensation prevents liquid water droplets from contacting or directly bombarding the sensing elements 214. Water droplets on the sensing elements 214 may adversely affect the response time for generating and transmitting humidity measurements to the controller 104 and may cause the sensing elements 214 to fail altogether. By minimizing the amount of liquid water that may be exposed to the sensing elements 214, the humidity sensing device 200 may have a faster response time and provide accurate humidity measurements which may assist the system 100 in achieving desired predetermined humidity levels for the air or hydrogen streams. In one example, the sensing device 200 may have a response time of one second.

The heater 212 is generally configured to heat the central housing 206 and/or the housing inlet 208 and maintain the temperature of the central housing 206 and/or the housing inlet 208 to a temperature that is greater than the temperature of the primary air and hydrogen streams which surround the outer housing 202. By maintaining a higher temperature within the central housing 206 (via the heater 212) the potential for condensation to take place is reduced. For example, the secondary stream passing through the central housing 206 generally includes water in vapor form. As noted above, water droplets are removed due to the outer housing 202 and the placement of the housing inlet 208 and the housing outlet 210 with respect to the flow direction of the primary fluid stream. In the event the secondary fluid stream experiences reduced temperatures while in the central housing 206, vapor in the secondary fluid stream may turn into water droplets (e.g., condensation) thereby affecting the accuracy of sensing elements 214. The outer housing 202 and the cavity 209 insulate the inner housing 204 from the colder temperatures of the primary air or hydrogen stream. Such a characteristic allows the heater 212 to operate more efficiently which ensures that the heater 212 may consume less power. The heater 212, if implemented as an electrically based heater, is generally adapted to consume 2-5 Watts. Conventional heaters incorporated into humidity sensors are generally adapted to consume up to 60 Watts or greater of power. Such a reduction in the amount of power consumed by the heater 212 may be based on the positioning of the central housing 206 within the outer housing 202 and the cavity 209. The controller 104 may control the heater 212 to reach the desired temperature.

Methods for heating the central housing 206 and/or the housing inlet 208 may include the heater 212 being implemented as an electrically based driven heater, a radiant heater, or a conductive heater. Other methods may include exposing the inner housing 204 to coolant discharged from the fuel cell stack 108 which is generally hotter than the temperature of air or hydrogen streams. In such a case, the heater 212 may or may not be needed. After heating the secondary fluid stream, the sensing elements 214 measures the amount of water in the secondary fluid stream 216. After which, the secondary fluid stream 216 is discharged through the housing outlet 208 and merged with the primary air or hydrogen stream and is distributed toward the fuel cell stack 108.

FIG. 3 depicts a humidity sensing device 300 in accordance to another embodiment of the present invention. The sensing device 300 includes an outer housing 302 that is generally shaped in the form of a wing or airfoil. The sensing device 300 includes an inner housing 304. The inner housing 304 includes a housing inlet 308, a central housing 306 and a housing outlet 310. The outer housing 302 defines a cavity 309 which surrounds a substantial amount of the inner housing 304. As shown, the shape of the conduit 102, 129 is generally symmetrical. The shape of the outer housing 302 is asymmetrical with respect to the inner walls of the conduit 102, 129. As such, an asymmetrical flow field of the air or hydrogen stream is produced (due to the asymmetric orientation of the outer housing 302), which, in turn, causes a velocity distribution around the outer housing 302. A pressure differential is created across the outer housing 302 in response to the velocity distribution of the air or hydrogen stream, which drives a secondary fluid stream 316 (of air or hydrogen) through the inner housing 304.

The housing inlet 308 is generally adapted to receive the secondary fluid stream at an angle of 180 degrees or slightly less than 180 degrees with respect to the flow direction 316 of the primary air or hydrogen streams. The housing outlet 310 may be positioned at 90 degrees with respect to the position of the housing inlet 308. Due to the positioning of the housing inlet 308 with respect to the primary air or hydrogen streams and the placement of the outer housing 302 directly within conduits 102, 129, these characteristics may minimize the amount of water that is capable of entering into the housing inlet 308 and into the central housing 306. Further, a heater 312 is adapted to maintain the temperature within the inner housing 304 and at a higher temperature than the temperature of the primary air and hydrogen streams which surround the outer housing 302. The increased heat characteristic prevents a substantial amount of water from bombarding the sensing elements 314 by eliminating condensation. In addition, the outer housing 302 and the cavity 309 isolate a substantial portion of the inner housing 304 from the cooler temperature of the primary air or hydrogen streams thereby increasing the efficiency of the heater 312 over conventional based humidity sensors. Similar benefits may be achieved with the sensing device 300 as discussed in connection with the sensing device 200. For example, the sensing device 300 may provide for a faster response time since water in liquid form may be eliminated due to placement of the outer housing 302 around the inner housing 304 and the implementation of the heater 312. The heater 312 may eliminate condensation in the inner housing 304. In addition, the sensing device 300 may provide humidity readings with increased accuracy when compared to conventional humidity sensors due to the characteristics as described above. The secondary fluid stream 316 is passed through the housing outlet 310 and merged with the primary air and hydrogen stream for delivery to the fuel cell stack 108.

Figure 4:
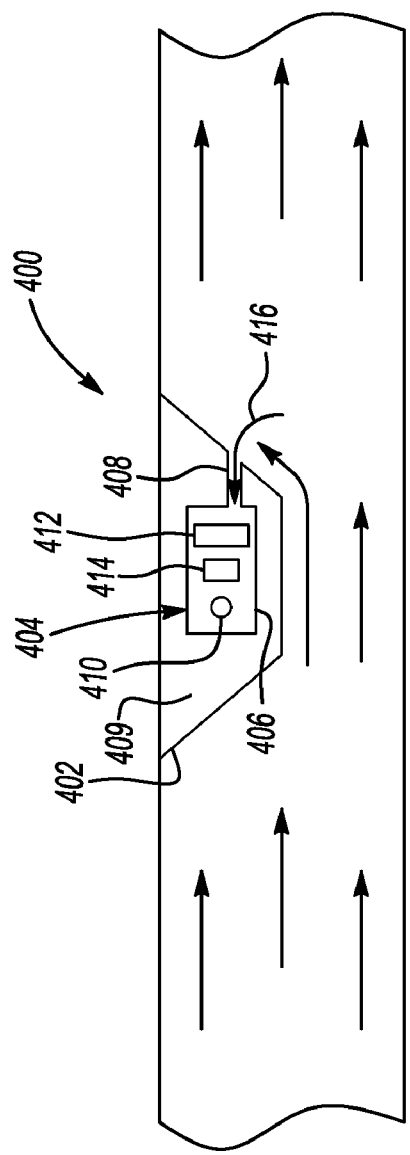
FIG. 4 depicts a humidity sensing device in accordance to another embodiment of the present invention.

FIG. 4 depicts a humidity sensing device 400 in accordance to another embodiment of the present invention. The sensing device 400 includes an outer housing 402 that is shaped in the form of a trapezoid and an inner housing 404. The inner housing 404 includes a central housing 406, a housing inlet 408 and a housing outlet 410. The outer housing 402 defines a cavity 409 which surrounds a substantial amount of the inner housing 404. As shown, the shape of the conduit is generally symmetrical with respect to the inner walls of the conduit 102, 129. The shape of the outer housing 402 is asymmetrical. As such, an asymmetrical flow field of the air or hydrogen stream is produced (e.g., due to the asymmetric configuration of the outer housing 402), which in turn causes a velocity distribution around the outer housing 402. A pressure differential is created across the outer housing 402, which drives a secondary fluid stream 416 (of air or hydrogen) through the inner housing 404.

The housing inlet 408 is generally adapted to receive the secondary fluid stream 416 at an angle of 180 degrees or less with respect to the flow direction of the primary air or hydrogen streams. The housing outlet 410 may be positioned 90 degrees from the position of the housing inlet 408. The positioning of the housing inlet 408 at an angle of 180 degrees with respect to the primary flow of the air or hydrogen stream minimizes the amount of water capable of entering into the housing inlet 408 and the inner housing 404. Further, a heater 312 is adapted to maintain the temperature within the inner housing 404 at a higher temperature than the temperature of the primary air and hydrogen streams which surround the outer housing 402. The increased heat characteristic prevents a substantial amount of water from bombarding the sensing elements 414. In addition, the outer housing 402 and the cavity 409 isolates a substantial portion of the inner housing 404 from the cooler temperature of the primary air or hydrogen streams thereby increasing the efficiency of the heater 412 over conventional based humidity sensors. Similar benefits may be achieved with the sensing device 400, as discussed in connection with the sensing device 200 and 300. For example, the sensing device 300 may provide for a faster response time since water in liquid form may be eliminated due to the placement of the outer housing 402 around the inner housing 404 and the implementation of the heater 412, which may eliminate condensation in the inner housing 404. In addition, the sensing device 300 may provide humidity readings with increased accuracy when compared to conventional humidity sensors due to the characteristics as described above. The secondary fluid stream 416 is passed through the housing outlet 410 and merged with the primary air and hydrogen stream for delivery to the fuel cell stack 108.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A humidity sensing device for determining an amount of humidity in at least one primary fluid stream that is passed to a fuel cell stack; the sensing device comprising:
   an outer housing positioned within at least one conduit such that the outer housing and the conduit coact with each other to generate at least one secondary fluid stream from the primary fluid stream; and
   an inner housing positioned within the outer housing and configured to receive the secondary fluid stream and to measure an amount of water present in the secondary fluid stream to determine the amount of humidity in the primary fluid stream, the inner housing including a housing inlet and a housing outlet positioned at an angle of generally ninety degrees or greater with respect to a flow direction of the primary fluid stream.

2. The humidity sensing device of claim 1 wherein the outer housing is shaped in at least one of an asymmetrical and symmetrical manner with respect to the conduit such that the outer housing positioned within the conduit coacts with the conduit to create an asymmetrical flow field of the primary fluid stream around the outer housing to generate the secondary fluid stream.

3. The humidity sensing device of claim 1 wherein the outer housing is shaped in a symmetrical manner and inner walls of the conduit are shaped in an asymmetrical manner such that the outer housing coacts with the inner walls of the conduit to create an asymmetrical flow field of the primary fluid stream around the outer housing to generate the secondary fluid stream.

4. The humidity sensing device of claim 1 wherein the outer housing is shaped in a asymmetrical manner and inner walls of the conduit are shaped in a symmetrical manner such that the outer housing coacts with the inner walls of the conduit to create an asymmetrical flow field of the primary fluid stream around the outer housing to generate the secondary fluid stream.

5. The humidity sensing device of claim 1 wherein the outer housing and the inner housing define a cavity positioned therebetween.

6. The humidity sensing device of claim 5 wherein the cavity is adapted to insulate the inner housing from exposure to colder temperatures of the primary fluid stream and to increase the operational efficiency of a heater.

7. The humidity sensing device of claim 1 wherein the inner housing includes sensing elements configured to measure the amount of water in vapor form and a heater configured to heat the inner housing and the sensing elements prior to the sensing elements measuring the amount of water to prevent condensation in the inner housing.

8. A system for determining an amount of humidity in at least one primary fluid stream in a vehicle, the system comprising:
   a supply adapted to generate the primary fluid stream;
   a fuel cell stack in fluid communication with the supply through at least one conduit for receiving the primary fluid stream; and
   a humidity sensing device for determining an amount of humidity present in the primary fluid stream, the humidity sensing device comprising:
      an outer housing positioned within at least one conduit including a protrusion positioned proximate to the outer housing such that the outer housing, the conduit, and the protrusion coact with each other to generate at least one secondary fluid stream from the primary fluid stream; and
      an inner housing positioned within the outer housing and configured to receive the secondary fluid stream and to measure an amount of water present in the secondary fluid stream for determining the amount of humidity in the primary fluid stream.

9. The humidity sensing device of claim 8 wherein the outer housing is shaped in a symmetrical manner with respect to the conduit.

10. The humidity sensing device of claim 8 wherein the outer housing and the inner housing define a cavity positioned therebetween.

11. The humidity sensing device of claim 10 wherein the cavity is adapted to insulate the inner housing from exposure to colder temperatures of the primary fluid stream and to increase the operational efficiency of a heater.

12. The humidity sensing device of claim 8 wherein the inner housing includes sensing elements configured to measure the amount of water in vapor form and a heater configured to heat the inner housing and the sensing elements prior to the sensing elements measuring the amount of water to prevent condensation in the inner housing.

13. The humidity sensing device of claim 8 wherein the inner housing includes a housing inlet and a housing outlet positioned at an angle of generally ninety degrees or greater with respect to the flow direction of the primary fluid stream.

14. A method for determining an amount of humidity in at least one primary fluid stream that is passed to a fuel cell stack, the method comprising:
   providing at least one conduit and an outer housing, wherein the outer housing is positioned within the conduit;
   directing the flow of the primary fluid stream with the conduit such that the primary fluid stream flows by at least portions of the outer housing;
   generating an asymmetric flow field of the primary fluid stream around the outer housing based on the shape of at least one of the outer housing and the conduit with respect to each other;
   causing a secondary fluid stream to flow into the outer housing in response to generating the asymmetric flow field;
   measuring an amount of water present in the secondary fluid stream to determine the amount of humidity in the primary fluid stream: and
   positioning a heater in the inner housing such that the heater and the outer housing coact with one another to prevent water droplets from being present in the secondary fluid stream.

15. The method of claim 14 wherein causing the secondary fluid stream further includes positioning an inner housing within the outer housing to receive the secondary fluid stream.

16. A humidity sensing device for receiving a primary fluid stream, the device comprising:
   an outer housing being formed in a symmetrical manner and being positioned within a conduit, at least one wall of the conduit being shaped in an asymmetrical manner to coact with at least a portion of the outer housing to create an asymmetrical flow field of the primary fluid stream for generating a secondary fluid stream; and
   an inner housing positioned within the outer housing and being configured to receive the secondary fluid stream and to measure an amount of a first fluid present in the secondary fluid stream to determine the amount of humidity in the primary fluid stream.

17. The device of claim 16 wherein the at least one wall includes a protrusion positioned about the outer housing such that the protrusion and the at least the portion of the outer housing coact with one another to generate the secondary fluid stream.

18. A vehicle humidity sensing device comprising:
   an outer housing formed in one of an asymmetrical and symmetrical shape and positioned within a conduit to coact therewith for generating a secondary fluid stream from a primary fluid stream; and
   an inner housing positioned within the outer housing and including a sensing element to measure an amount of a first fluid present in the secondary fluid stream and a heater to heat the inner housing.

19. A humidity sensing device comprising:
   an outer housing formed in one of an asymmetrical and symmetrical shape and being positioned within a conduit such that at least a portion of the outer housing and the conduit coact with one another to generate a secondary fluid stream from a primary fluid stream; and
   an inner housing positioned within the outer housing and including a heater, the inner housing being configured to measure an amount of a first fluid present in the secondary fluid stream to determine the amount of humidity in the primary fluid stream,
   wherein the outer housing and the inner housing define a cavity positioned therebetween to insulate the inner housing from exposure of a low temperature of the primary fluid stream thereby increasing heater efficiency.

* * * * *